United States Patent

Sherer et al.

[15] 3,685,047

[45] Aug. 15, 1972

[54] SEISMIC AMPLIFIERS

[72] Inventors: Paul Sherer, Marina Del Rey; Phillip C. Halverson, Fullerton, both of Calif.

[73] Assignee: SDS Data Systems, Inc., Santa Monica, Calif.

[22] Filed: July 31, 1970

[21] Appl. No.: 60,068

Related U.S. Application Data

[62] Division of Ser. No. 537,386, March 25, 1966, Pat. No. 3,525,948.

[52] U.S. Cl. ..........................340/347 AD, 340/15.5

[51] Int. Cl. ..........................................H03r 13/02

[58] Field of Search...340/347 AD, 15.5 R, 15.5 GC; 330/29, 86, 110, 124, 137, 138

[56] References Cited

UNITED STATES PATENTS

| | | | |
|---|---|---|---|
| 3,376,557 | 4/1968 | Godinez | 340/15.5 GC X |
| 3,299,421 | 1/1967 | Neitzel | 340/347 AD |
| 3,516,085 | 6/1970 | Dano | 340/347 AD |
| 3,315,223 | 4/1967 | Hibbard et al. | 340/15.5 GC X |
| 3,392,370 | 7/1968 | Neitzel | 340/15.5 GC X |
| 3,241,100 | 3/1966 | Loofburrow | 340/15.5 GC X |

*Primary Examiner*—Thomas A. Robinson
*Attorney*—Donald Gunn

[57] ABSTRACT

A system forming a digitized representation of an analog signal ranging over a wide DB range which incorporates a pre-amplifier, a post amplifier, and digitizer. The digitizer is limited to a maximum input voltage. The amplifier circuitry connected to the digitizer is switched in gain level to precondition the signal for the digitizer. A gain control circuit for the amplifier forms a digitized value representative of system gain. The output of the system is a floating point representation of the analog signal having a sign bit, a digitized mantissa, and a gain level code in digital form.

19 Claims, 5 Drawing Figures

Figures 1, 1A, 1B:
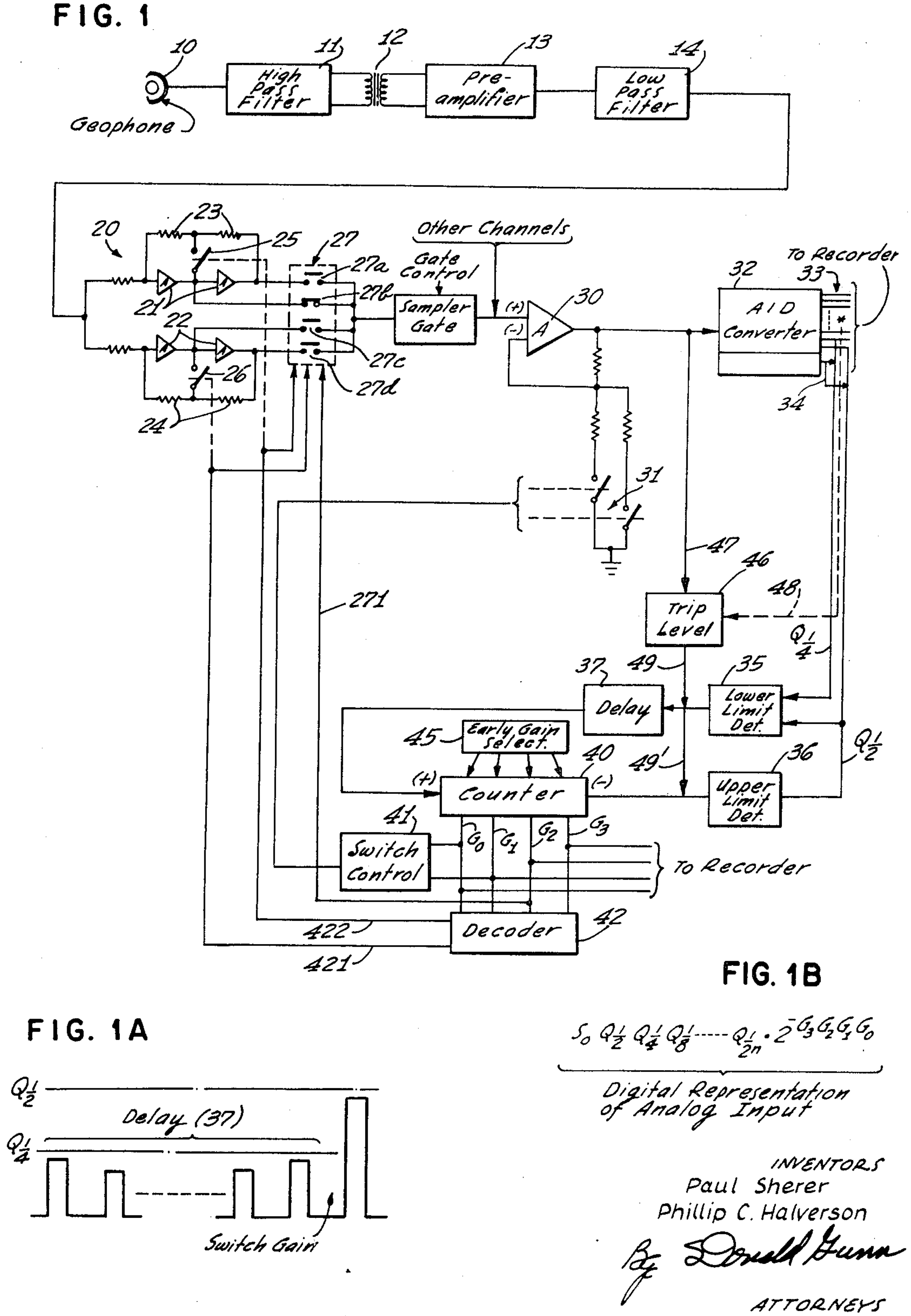

INVENTORS
Paul Sherer
Phillip C. Halverson

By Donald Gunn

ATTORNEYS

| Gain Level | Gain Code $G_3G_2G_1G_0$ | 30 | Post Amplifiers 27 | 21 | 22 | Gain | Decibels |
|---|---|---|---|---|---|---|---|
| 1 | 0000 | 1 | 27b | 1 | 16 | 1 | 0 |
| 2 | 0001 | 2 | 27b | 1 | 16 | 2 | 6 |
| 3 | 0010 | 4 | 27b | 1 | 16 | 4 | 12 |
| 4 | 0011 | 8 | 27b | 1 | 16 | 8 | 18 |
| 5 | 0100 | 1 | 27d | 1 | 16 | 16 | 24 |
| 6 | 0101 | 2 | 27d | 1 | 16 | 32 | 30 |
| 7 | 0110 | 4 | 27d | 1 | 16 | 64 | 36 |
| 8 | 0111 | 8 | 27d | 256 | 16 | 128 | 42 |
| 9 | 1000 | 1 | 27a | 256 | 16 | 256 | 48 |
| 10 | 1001 | 2 | 27a | 256 | 16 | 512 | 54 |
| 11 | 1010 | 4 | 27a | 256 | 16 | 1024 | 60 |
| 12 | 1011 | 8 | 27a | 256 | 4096 | 2048 | 66 |
| 13 | 1100 | 1 | 27c | 256 | 4096 | 4096 | 72 |
| 14 | 1101 | 2 | 27c | 256 | 4096 | 8192 | 78 |
| 15 | 1110 | 4 | 27c | 256 | 4096 | 16384 | 84 |

INVENTORS
Paul Sherer
Phillip C. Halverson

ATTORNEYS

SEISMIC AMPLIFIERS

RELATED APPLICATIONS

This application is a division of application Ser. No. 537,386, filed Mar. 25, 1966, now U.S. Pat. No. 3,525,948 by the same inventors, titled "Seismic Amplifiers."

SUMMARY OF PROBLEM AND INVENTION

The present invention relates to an amplifier for analog signals having a gain which is adjustable over a wide range of gain levels. More particularly, the invention relates to an amplifier in which the gain is adjustable in the process of digitizing the amplified analog signal. While finding utility beyond the field of processing seismic signals, the invention will be explained with reference to geophysical exploration as the preferred field of application.

The purpose of seismic data processing is to extract usable information about underground geological structures from a vast mass of detailed signals and noise. Customarily, a test charge is exploded, setting up vibrations which travel through the underground. Geophones are placed at different locations, spaced apart from each other as well as from the location of the explosion. The geophones pick up these vibrations. Signals from the geophones reveal information regarding the structure of subsurface strata.

The extraction of useful data from these signals has always been a difficult task, and the exploration industry has typically employed the most advanced technology as an aid. In recent years, the search for oil has required deeper exploration into the earth and delineate analysis of more complex oil trapping structures. Offshore prospecting has introduced additional complications as well as substantially increasing the sheer volume of data recorded.

As a result of all these factors, the wanted signal is often small; it may lay even below the noise level. The most effective way to recover these extremely low level signals is by way of mathmetical processes in a digital computer. Furthermore, the computer brings great flexibility to the data reduction task. Procedure changes only require revisions in the computer program; it is not necessary to redesign and rearrange physical hardware. The digital computer, unlike analog processing methods, can process seismic data with any desired degree of precision, depending on the number of binary bits employed. Consequently, the overall data acquisition and processing system is limited not by the precision of computation, but by capability of the analog input amplifiers and/or of the digitizing and recording units used in gathering the seismic data.

In seismic work, an acceptable sample rate is one thousand samples per second per measuring channel. Modern electronic equipment is capable of digitizing and recording fifteen bits per sample, or more if necessary, which is equivalent to 84 DB dynamic range. Dynamic range is usually defined as the ratio of the maximum signal handled to the minimum signal distinguishable.

This capability of digital process points to the seismic amplifier as the limiting element. The present invention relates to a seismic amplifier, or more precisely, to an amplifier which finds utility in this field, without degrading the performance of the rest of the system. It can, therefore, be seen that one of the requirements of such an amplifier should be that it is capable of passing the dynamic range of at least 84 DB. If by means of amplifier design additional range could be added to the system, it is rather easy to adjust the processing computer, primarily through programming, to take advantage of the higher degree of accuracy. The invention now provides for such an automatic gain ranging amplifier which meets the aforementioned requirements.

As must be emphasized, the preferred embodiment is described in the context of a seismic data collection system. Such an area of use is not intended as a limitation on the apparatus and its application.

Of great interest in the present invention is the inclusion of two cascaded adjustable amplifier circuits. One is adjustable in fine steps. The other is adjustable in larger or coarse steps.

The amplifier in accordance with the present invention has the following features. An analog signal is received, for example, from a geophone or any other suitable source of analog signals. The signal is presumed to vary over a very wide range. The input signal is passed through two cascaded amplifying networks. One of these amplifying networks has adjustable or selectable gain levels which differ by a factor of two from a minimum to a maximum gain level. The gain levels adjustable therewith form the fine scale of the system. The gain is adjusted in this first amplifying network during on-line operation.

The second amplifying network is cascaded with the first one and provides coarse gain adjustment. It is comprised preferably of two parallel amplifiers, both receiving the analog signal, but only one is cascaded with the first amplifier. The coarse gain adjustment is carried out in the amplifier of this second network which is not cascaded at any time with the first amplifying network. During operation, the coarse gain of the amplifier system is adjusted by alternating the cascading of the amplifiers in the second network with the first amplifier network.

The analog signal as amplified by the two amplifying networks is fed to a digitizer or analog-to-digital converter altering the analog signal to a digital format with, for example, 14 bit resolution plus a sign bit. The degree of resolution is basically arbitrary and depends entirely on the intended use of the system. In the preferred form, the digital output signal is presented in binary expansion. The gain level is adjusted in the two amplifier networks such that a gain level change of the smallest order corresponds to multiplication or division by two, as far as the resulting change of the digital output of the analog-to-digital converter is concerned.

In the preferred embodiment, fifteen gain levels in the entire system are automatically selected except for what is called an early gain selecting which will be discussed below. Otherwise, the system optimizes gain solely on the basis of the signal amplitude, and thereby eliminates operator judgment in this matter. The output of the cascaded amplifiers ordinarily is held between one-quarter and one-half of digitizer full output scale. The upper set point is selected so that the seismic signal might double, but still remain within the ditigizer scale. Thus, an input signal burst, increasing at a rate of 6 DB per millisecond, is digitized and processed. Yet, even when the signal falls below the quarter scale as the seismic signal decays even into the noise level, very small signals are very precisely digitized through the use of the wide dynamic range of the digitizer.

In practice, the selection of set points strikes the trade-off between the need to record burst-outs and the need to resolve signals below the lower set point. The selection of the appropriate gain level is the function of a gain selector and control unit. This unit includes logic elements which compare the digital output of the digitizer with the upper and lower set points. Additionally, the gain selector includes a four bit up-down counter which stores a four bit binary code number, which in turn controls the gain of the amplifiers.

As the seismic signal decreases and falls below one-quarter scale, the counter is incremented up one gain level. If the signal increases and exceeds half scale, the counter is decremented by one. The output of the gain selector counter is decoded to control the two parallel operating, coarse gain level adjustable amplifier and the fine gain level adjustable amplifier. In particular, for any required change in gain, the amplifier having adjustable gain in fine steps is changed on-line. The coarse gain level is controlled also in on-line operation in that the decoded content of the counter alternates the cascading. However, the disconnected coarse adjustable amplifier is itself changed when off-line.

The digitizer output and the counter output are recorded, for example, on magnetic tape. As defined below, each digitizer output number, together with the concurring counter number, forms a binary floating point number representation of the analog signal.

In some applications, a single channel extending from a geophone to the digitizer is not used. There are several geophones comprising a spread placed at different locations to obtain the vibrations of an exploratory detonation. Ultimately, the output signal of each geophone is processed through a single digital channel. Thus, somewhere along the signal transmission, there is normally found a multiplexing network. Its presence yields the following two consequences. One aspect is that the analog signal for each particular geophone is not sampled continuously, but only during the discrete periods of time. Of course, the sampling rate must exceed the highest frequency in the analog signal bearing useful information.

The other aspect is that it has been found useful to put the multiplexer between the coarse gain adjustable amplifier and the fine gain adjustable amplifier, so that each geophone feeds a signal to its own coarse gain adjustable amplifier network, but the fine gain adjustable amplifier is common to all channels, i.e., it is placed at the output side of the multiplexer. The system may have a large number of geophones, i.e., of analog signal input channels, and it may not be advisable to use the same gain control unit for all of the channels.

To accommodate variations in field conditions, the user may specify the number of gain control units per system. If one unit is used, this is called ganged control. If a gain control unit is connected to a group of inputs, say four, then it independently controls the gain of its group. This is called group ganged control. If a gain selector and control unit is found in each channel, it is responsive only to the amplitude of that channel. This is called individual gain control. With this arrangement, the gain of each channel is optimal at all times.

Generally, where prospecting is confined to shallow horizons, interchannel amplitude variations over a period of time are small, and ganged gain control is adequate. Where a geophone spread extends over a larger distance, interchannel variations are larger, perhaps 20 to 30 DB. In this event, it is best to use individual gain. The four bit gain code number in the counter of a gain control unit is recorded on magnetic tape once for several entries in the case of ganged gain and once for each sample in the case of individual gain control.

Another feature of the system is an early gain selector switch which permits the operator to set the initial gain at a low value which is held in spite of the fact that the gain level automatically cycles up to a high value with no initial signal. The amplifier holds the initial gain value until an initial peak exceeds a set trip control. The trip control can be adjusted by the operator to override the automatic gain control.

The decaying analog signal is bipolar and hence, the signal crosses zero level many times. It is apparent that some of the sample values of the signal fall below the one-quarter scale set point and would normally trigger a gain increase. Still, the signal peaks interspersed between the zero values may well be above the lower set point. A means is neeced to delay the gain increase until several samples fall below the trigger level.

In the present system, this is accomplished by examining all samples of all channels in a gain group or several samples in a single channel for a period of time which may be adjustable by a release rate switch. The release rate is an expression of the speed in decibels per second at which the amplifier system is capable of increasing gain to follow a declining seismic signal.

As soon as all samples are below the lower set point for an examination period, the gain is increased to the next level. If we assume that, for example, the gain levels are apart (on the fine scale) by about 6 DB, then, with a thirty millisecond examination period, for example, the gain would be increased by 6 DB every 30 milliseconds, or at a rate of 200 DB per second. This examination period is an asynchronous sliding window that finds the earliest possible time when the conditions for a gain increase are satisfied.

The system is capable of reducing gain at a very rapid attack rate of 6000 DB per second. If any sample of any channel exceeds the upper scale set point which is one-half of the full scale value of the digitizer output, then the gain is reduced by one step immediately, that is, at the next scan. Thus, gain reductions can occur at a maximum rate of 6 DB each millisecond, which typically is the time of one scan; this is the equivalent of 6000 DB per second.

As already pointed out in the discussion of quarter and half scale set points, an increasing signal such as a burst-out has a 6 DB range on the digitizer output scale available before it exceeds the upper limit of the digitizer. Now it may be noticed that the digitizer scale may, in effect, be doubled in gain in only one single scan of 1 millisecond. Thus, the system is capable of reducing the gain at a dynamic rate of 6000 DB per second, which is fast enough to follow nearly any signal.

Figures 2, 3:
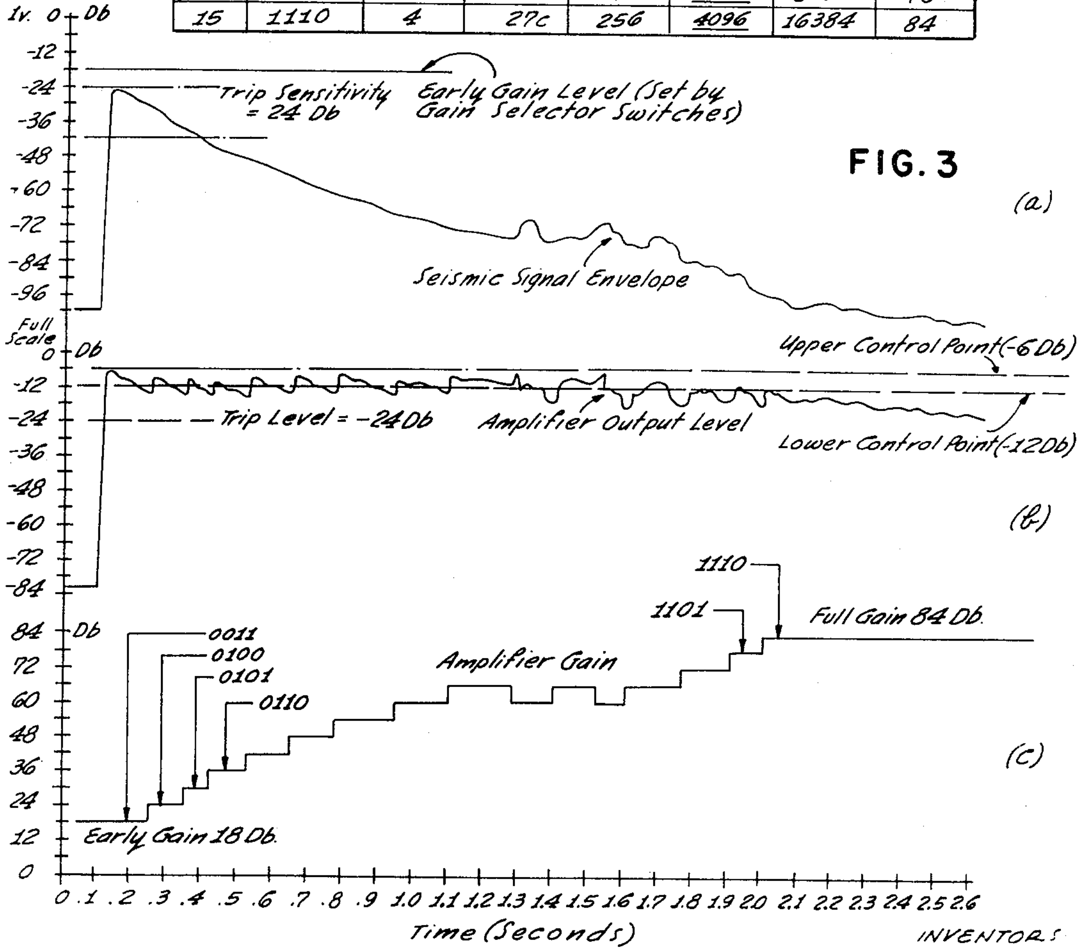

While the specification concludes with claims particularly pointing out and distinctly claiming the subject matter which is regarded as the invention, it is believed that the invention, the objects, and features of the invention, and further objects, features and advantages thereof, will be better understood from the following description taken in connection with the accompanying drawings in which:

FIG. 1 illustrates somewhat schematically a circuit diagram, primarily as a block diagram, of the preferred embodiment of the present invention;

FIG. 1*a* illustrates a timing diagram for sample pulses and the effect of a delayed gain increase;

FIG. 1*b* illustrates a digital representation of the information signal to be recorded;

FIG. 2 illustrates a table showing the relationship between the gain level changes in the amplifiers as shown in FIG. 1 in relation to various controls and other data developed also by and in the circuit as shown in FIG. 1; and, FIG. 3 illustrates in three diagrams the processing of an analog signal in the system as shown in FIG. 1.

Proceeding now to the detailed description of the drawings, in FIG. 1, there is shown a source of variable analog signals such as a geophone 10. This geophone 10 may be suitably positioned to pick up shock waves and other seismic data to be processed. An electrical output signal is provided by the geophone 10 and is fed to a high-pass filter 11, also called a low cut filter, and having a cut-off frequency of, for example, 10 cps with an 18 DB octave roll-off rate. Among other functions, the filter 11 prevents long surface waves, also called Rayleigh waves, from entering the system because it is usually desirable to examine seismic waves which have traveled through deep substrata.

The output signal of the filter 11 is passed through a transformer 12 to provide a low noise information signal to a preamplifier 13. The amplifier 13 is a low noise preamplifier with fixed gain. The amplifier isolates the geophone from the succeeding stages and circuit elements. The fixed gain of the amplifier 13 is selected as a compromise between the maximum peak level desired and the need to minimize noise in the succeeding stages. A gain of 10 was found to be a suitable compromise, permitting the processing of signals from the geophone as large as about 1 volt, down to fractions of a microvolt and without introducing excess noise.

The preamplifier 13 is connected to a low-pass filter 14, also called a high cut filter. Since information will be later sampled at a particular sample rate, the sampling frequency is best eliminated. Hence, the filter 14 has a cut-off frequency one-quarter of the switching frequency of the sampling control. Thus, if the sample period is about 2 milliseconds corresponding to 500 cps, then the cut-off frequency of the filter 14 should be 125 cps or less.

The output of the filter 14 drives a postamplifier network 20 comprising amplifiers 21 and 22, each having two stages connected in series. The two amplifiers 21 and 22 operate in parallel at all times, as they are both connected permanently to the output side of the filter 14. The two amplifiers have feedback networks 23 and 24, respectively, which include switches 25 and 26. Thus, each amplifier has two selectable gains. The amplifier 21 preferably has either a gain of 16 ($=2^4$) or a gain of 4096 ($=2^{12}$). The gain of the amplifiers is respectively determined by the position of the switches 25 and 26. The switches 25 and 26 may be incorporated in relays or in electronic switches.

The amplifier stages have their output terminals respectively connected to four switches **27*a*, 27*b*, 27*c*, and 27*d* of a control switching device 27. The switch 27 provides a signal path to a sampling gate 28 such that only one of the two amplifiers 21 and 22 is connected to the sampling gate 28. The system attains a coarsely adjusted gain level as it exists in the particular amplifier connected to sampling gate 28. The operating gain level of the amplifier system can thus have four levels, $2^0$, $2^4$, $2^8$, or $2^{12}$, and for each gain level a different one of the four switches 27 is closed. The operating gain is dynamically changed by changing the particular one of the switches 27 which is closed. The gain level within both amplifiers 21 and 22 is changed only in the particular amplifier disconnected from the sampling gate 28**.

The sampling gate 28 has high speed, low cross talk and low offset voltage. It may include a transistor switching element wherein the output settles in less than 1 microsecond. The sample gate 28 may be a component of a multiplexing network so that circuit network connected to the output side of the sample gate 28 is common to a plurality of similar channels having a geophone as input source and the amplifiers 13 and 20. Since the signal processing can occur at a much higher rate than the highest useful information signal frequency, multiplexing is permissable to process signals from the different sources and channels through a single processing channel. In case of multiplexing, the gate 28 receives a gating, sampling or switching signal from a sequencer (not shown) controlling the multiplexing operation. The other channels are controlled in an analogous manner and in a manner which ensures orderly sequencing.

The output of the gate 28 (and of other similar gates in case of multiplexing) is supplied to a common buffer amplifier 30. The buffer amplifier 30 has two stages and a feedback network for providing adjustable gain. In particular, the amplifier 30 has a fine gain adjustment circuit operated by control switches 31. These switches are preferably transistors because high speed operation is more essential here. By operation of the several switches 31, a gain of one, two, four or eight can be selected for the amplifier 30. The control of the switches 31 will be described more fully below.

The output of the amplifier 30 is fed to an analog-to-digital converter for digitizing the analog signal it receives. The digital signal appears in binary expansion and in a parallel-by-bit format in several output channels 33. The digital signal also includes a sign bit in a sign bit channel 34. The number of bits, i.e., the number of channels, is one of the factors which determines the resolution of the information, but is of no great concern to the principle of the invention. An example will be given below.

Analog-to-digital converters operate in the following manner. For a given analog input signal, they provide a digital signal. The input signal is said to have full scale value if, for positive polarity, all digital output channels have "one" bits. The corresponding digital signal thus represents that analog signal subject to an error less than half of the least significant bit. Accordingly, for an input signal of half-scale value, the resulting digital output signal has a "one" bit (for "positive sign" in the most significant bit channel and "zero" bits in all less significant bit positions and channels. For an input analog signal of quarter scale value, the second most significant bit will be a "one" and the most significant bit as well as other bits will be "zeros."

The absolute scale value of such a signal is basically arbitrary, but once selected, it must be consistent. In other words, there is no concern with any particular calibration level for resolving the vibration amplitudes as measured by the geophone. There is concern only with the relative magnitude of a signal in relation to preceding and succeeding signals of the same signal train and in relation to signals picked up by other geophones.

Thus, one may select an analog signal to represent a full scale value. Full scale value may, for example, be established when the geophone produces a signal of 1 volt so that the amplifier 13 provides 10 volts. If the switches 25 and 27 are adjusted so that the amplifier 21 has a gain of one and the switches 31 are adjusted so that the amplifier 30 has a gain of one, then the digitizer 32 is provided with the selected maximum analog value. The digitizer cannot process larger analog signals which exceed its limit by an analog increment corresponding to the lowest bit value. The digital signal formed by the A–D converter 32 has a decimal point to the left of the most significant bit, and is a number written as:

$$.Q_{1/2}, Q_{1/4}, Q_{1/8}, ---, Q_{1/2n}$$

Where:

*n* is the number of digital channels

Q denotes the several bits of descending significance from left to right.

This digital signal, however, has meaning only in this form as long as the gain in the entire circuit between the geophone 10 and the A–D converter 32 does not change, and only then can the digital number as presented in the channel 33 be regarded as describing completely the value of the information signal.

Assuming now that for some analog signal, the switches 31 are readjusted to provide a gain of two at the amplifier 30, then the value of the analog signal at the input side of the converter 32 is doubled and the bits in the channel 33 are shifted to the left by one bit position. This digital signal does not completely describe the input signal any more. Hence, an indication is needed signifying that the position values of the data in the output channels 33 have been changed. To provide a digital signal which is comparable with the one produced when the amplifier 30 had a gain of one, the digital signal produced for a gain of two must be divided by two, i.e., an indication for that gain value should accompany the digital signal produced with the gain of two to place the output signal on a comparable basis with the digital signal produced when the gain was one.

It can readily be seen that now for a gain, say $2^m$ (still considered the same input at the geophone 10), the resulting digital signal must be associated with, i.e., divided by the factor $2^{m-1}$ in order to be meaningfully comparable with the digital signal produced with a gain of one. It follows that any digital signal which is output by the channel 33 is an incomplete representation of an analog signal; one additionally needs the particular gain level in the analog channel to place several digital signals produced at different gain levels on comparable basis.

Reviewing the cascaded circuitry, the amplifier network 20 provides coarse gain levels $2^0$, $2^4$, $2^8$, and $2^{12}$; the amplifier 30 provides fine gain levels $2^0$, $2^1$, $2^2$, and $2^3$. Inasmuch as the overall gain of the amplifiers 20 and 30 together is a product of the individual gains, it can be seen that selective switching permits adjustment of gains from unity (=$2^0$) up to $2^{15}$, on a continuous binary scale. The exponent of the base of two expresses the presently existing gain in the system and is called the gain code. This gain code can be a number between zero and 15 (decimal), but the gain code can itself also be expressed in binary expansion, using four bits. Thus, the gain code is a binary number ranging from 0000 to 1111, inclusive. This gain code is given by bits which will be denoted as $G_3$, $G_2$, $G_1$, $G_0$, the subscripts representing the order of significance.

Thus, the digital signal representing an analog measuring signal at any instant is completely described by the following expression:

$$S \cdot Q_{1/2}Q_{1/4}Q_{1/8} \ . \ . \ . \ Q_{1/2^n} \times 2^{-G_3G_2G_1G_0}$$

This is a binary floating point representation of the measuring signal wherein S is a sign bit, Q is a mantissa bit, and G is an exponent and gain code bit.

An increase in gain is a multiplication of the input signal compared with an amplifier gain of one. Thus, the digital output must be divided by the gain value to place the signals on a comparable level. Hence, the exponent has a negative sign.

Attention is next directed to the table of FIG. 2 which shows in the first column the gain levels, identified by number in consecutive order. The second column shows the corresponding gain code. The third, fifth and sixth columns show the gain levels respectively in the amplifiers 30, 21 and 22. The fourth column shows which one of the two amplifiers 21 and 22 is cascaded with the amplifier 30 by means of the four switches 27*a*, 27*b*, 27*c*, or 27*d*, with the closed switch being listed for the several gain levels. The last two columns respectively show the resulting gain, as gain factors as well as in decibels. The system potentially can achieve sixteen gain levels, but the last one is not used in the preferred embodiment.

The system as described to this juncture forms only for the mantissa and sign bits. Next, the gain control unit which forms the gain code signals and establishes automatically the gain as required will be described.

The gain control unit establishes for each particular input signal or series of analog input signals a particular gain, so that the input signals can be represented in digital form with the highest number of bits available so as to use the resolution capabilities of the system to the fullest.

The gain code is stored in a counter 40 having four stages to form a binary counter. The state of each stage represents one of the gain code bits G. As denoted schematically, there are four output channels for providing the gain code bits $G_0$, $G_1$, $G_2$, and $G_3$. These bits control the state of the switches 25, 26, 27 and 31 to establish the corresponding gain of the amplifier systems 20 and 30. The table of FIG. 2 illustrates the mode of control.

The low order bits of the gain code $G_0$ and $G_1$, control the two switches 31 through a control device 41 to provide the fine gain adjustments in the amplifier 30. The gain in the amplifier 30 can be one of the values one, two, four, or eight. These gain values are established by selective opening and closing of the two switches 31 because they define altogether four switching positions. The details of this control are conventional and it will be appreciated that the control device 41 merely opens and closes the switches 31 depending on the subcode expressible by the two low order bits $G_0$ and $G_1$. The four gains are represented by the subcodes 00, 01, 10, 11, and the control device 41 controls the switches 31 accordingly to respectively establish in the amplifier 30 gain values one, two, four, or eight.

As can be seen further from the second and fourth column of the table in FIG. 2, the value of bit $G_2$ determines whether one of the switches 27*c* and 27*d* ($G_2$=1) is to be closed. The respective existing states of the switches 25 or 26 particularizes the choice. For $G_2$=0 and an open state at the switch 25, the switch 27*a* is closed, while for a closed state at the switch 25, the switch 27*b* will be closed. For bit value "one" of bit $G_2$ with the switch 26 being open, the switch 27*c* is closed, but when the switch 26 is closed, the switch 27*d* is closed. Thus, as representatively illustrated with a command line 271, the bit $G_2$ controls directly the position of the switching device 27; however, the choice between the switches 27*a* and 27*b* or between the switches 27*c* and 27*d* depends on the gain to which the amplifier about to be connected has been adjusted previously. Switching thus occurs for gain level changes from three to four, eight to nine, and 12 to 13. This control by switching on-line effects the coarse gain of the system directly. The amplifiers 21 and 22 never have the same gain because their gain levels are interleafed, so that any switching operation by means of the switches 27 necessarily changes the gain in the entire amplifier system.

If we speak of a direct control of the switches 27 by bit $G_2$, it is understood that these will be high speed semi-conductor devices energized and deenergized in accordance with the current flow in the line providing the bit $G_2$ and in dependence upon signals in the lines 421 and 422.

The control of the switches 25 and 26 does not follow a symmetrical code pattern because gain increases are permitted slower than gain decreases as will be explained more fully below. All gain code bits are needed for the operation of a gain code decoder 42. The decoder matrix 42 has two output lines 421 and 422, respectively, controlling the switches 25 and 26 in accordance with the following pattern. For gain codes below seven (0111), the amplifier 21 has a gain of one and the switch 25 is closed. For gain codes of seven and higher, the switch 25 is open to provide a gain 256. For gain codes below 12 (1100), the switch 26 is closed and the amplifier 22 has a gain of 16; for gain codes 12 and higher, the switch 26 is open and the amplifier 22 has a gain of 4096.

It is significant that the gains are changed in the amplifiers 21 or 22 only when disconnected from the sample gate 28. It can be seen, however, that the gain is changed in the respectively disconnected amplifier at level changes asymmetrically related to level changes which accompany change in the amplifier connected by operation of the switching device 27. The reason for this will be explained more fully hereinafter.

In summary, the content of the register counter 40 determines the gain which is effective in any instant and thus, the number presented by the register counter 40 is the above identified gain code which supplements the digital information provided by the channel 33 for defining the exponent of the floating representation of the input signal.

Next, it will be described how the information signal is used to control the gain code. The basic control concept is to provide optimum use of the capabilities of the digitizer without exceeding its range and attaining maximum resolution. This is achieved in this manner. When the analog signal input for the A–D converter 32 exceeds the half scale value, the gain is increased to the next higher gain level. Of course, the gain increase corresponds to a multiplication of the digital output by two, i.e., a shift of the bits to the left. The gain increase corresponds to a division by two, or a shift to the right.

The gain changes are accomplished by incrementing and decrementing the gain code number held in the counter 40.

A one bit in the $Q_{1/2}$ bit channel of the digital output channels 33 for a positive signal represents an analog signal component equal to half scale value and thus controls the counter 40 by causing subtraction of a "one" from the counter content. Zero bits in both the $Q_{1/2}$ and $Q_{1/4}$ bit channels represent dropping of the analog input signal for the converter 32 below the quarter scale value, and this condition causes the adding of a "one" to the gain code number in the counter 40.

A detector 36 directly detects a "one" bit in the line $Q_{1/2}$ and feeds a signal to the subtract or decrementing input for the counter 40. However, it will be understood that the gain is not changed during a sample period. The same gating signal which opens the gate 28 may trigger the counter 40 at the tailing edge of the signal, to decrement the counter if the analog signal as sampled exceeded the half scale value at the upper set point.

The new, lower gain is then available for the next sampling period. For group gain control, this next sampling period may be provided for sampling of another geophone output signal and directly succeeding the instant one. In case of strictly single channel operation, with or without multiplexing involved, the gain change is effective only when the same channel is sampled during its next sample period. In either case, as the analog signal increases above the upper limit value or set point, the gain is adjusted promptly as far as this particular channel or others are concerned.

The situation is different when the analog signal decreases in value. A signal drop may occur because the signal approaches a zero crossing, so that an increase in gain would be undesirable. First, of course, the detector 35 monitors zero bits in the $Q_{1/2}$ and $Q_{1/4}$ bit channels to search for the condition that the lower limit has been exceeded in downward direction. The resulting output signal of the limit detector 35 is not used immediately and directly, but it triggers, i.e., starts, a delay device 37.

The delay device 37 may include a reset integrator with a threshold behavior at the output to provide an output signal only if the reset integrator is allowed to run for a preferably adjustable period of time. Thus, the device 37 produces an output signal only if the detector output is sustained at least for the delay period for the device 37. This delay period may be adjusted to exceed half the oscillation period for the longest wave to be detected. The delay device will thus be adjusted to half the period of the cut-off frequency of the high pass filter 11. A gain increase is in order only when the signal drop has thus been identified as not belonging to a zero crossing. The output of the delay device 37 increments the counter 40 by one.

The advanced gain ranging amplifier as described meets the needs for geophysicists for wide dynamic range automatic gain selection and recording. At any instant, the gain code counter identifies one out of 15 gain levels and sets the gain in the amplifier networks 20 and 30 accordingly. The resulting analog signal is digitized in an expression normally including thirteen digits. Should the digitized signal include zeros in the first two digits, then the gain code is increased. Should the digital signal place a one in the first digit, then the gain code is decreased. The signal, ready for processing, will, for each analog value, comprise the output of the digitizer 32 and the adjusted gain code in the counter 40.

In order to understand the full resolution capabilities of this amplifier, consider the following possibilities. The two cascaded amplifiers or amplifier networks 20 and 30 supply half of the total resolution. The lowest gain has been taken as one, and each succeeding gain level doubles that value, i.e., it progresses to two, four, eight, and so on. The highest gain is 16,384. In other words, the static range of the amplifier is doubled automatically 14 times to accommodate the declining seismic input signal. Its lowest range is considered to be a resolution of one, and the highest range representative of a resolution of 16,384. In effect, the gain level as set by the gain counter 40 and interpreted as a code reporting the gain level in use also indicates the resolution achieved by the amplifier.

The digitizer 32 supplies the other half of the total resolution obtained by the system. The output signal produced by the amplifiers for any one of the amplifier ranges is applied to the digitizer and is separated therein into 16,384 ($=2^{14}$) distinct amplitude levels because the digitizer has a 14 bit output. In the binary number system, each bit added after the first one doubles the resolution. Thus, the resolving power of the amplifier-digitizer combination is one part in $2^{28}$ parts, or one part in 268,435,456.

The system can operate in the following dynamic range. As stated above, dynamic range is the ratio of the maximum signal handled to the minimum signal distinguishable. By using the following relationship, the dynamic range of the smallest order in the system is expressed in decibels:

$$20 \log_{10} \frac{\text{maximum signal}}{\text{minimum signal}} = 20 \log\ 2 = 20 \times 0.301 = 6\,DB$$

The system now provides for an enlargement and selection of the dynamic range in increments of 6 DB. Each time the gain level is doubled, or each time a bit is added in the digitizer, the binary resolution is doubled, the dynamic range is increased by 6 DB. With fourteen gains changes, the amplifier resolution may be expressed as 84 DB. Similarly, 14 binary bits after the first one are also equivalent to 84 DB. Together with the amplifier and digitizer, the dynamic range derived from the resolution figures is 168 DB. On the basis of analog experience, this figure may seem unrealistically high.

A discussion of the dynamic range of the present invention, its ability to combat noise, and other points are found from Column 10, Line 58, to Column 12, Line 33, of the disclosure copending with this disclosure.

The system as described will operate satisfactorily when measuring has already begun and when signals are received by the geophone, or by the several geophones for a multiplexed system. However, it has to be observed that prior to this normal mode of operation with the geophone or geophones in position, the device is turned on to establish a state of expectancy. Then the charge is detonated, and in due time, the geophones will pick up signals. Thus, the receiving device must be in a ready state during an initial period prior to the arrival of the first signal. All the while, a zero signal or just noise is picked up by the geophone.

As the level of the spurious signals and noise is quite low, the system would automatically begin to adjust the gain level up to the highest level it can reach. On the other hand, the first seismic signals expected to be received will, in the usual case, have the maximum amplitude of the run, thus requiring a rather low gain level, possibly even the lowest gain level at the beginning of the run.

As was explained earlier in this specification, a reduction in gain is delayed, step by step, in order to search for zero crossings where the current gain level is to be maintained. Thus, a gain adjustment from the highest gain level as it may exist for the noise as an input signal, down to the lowest gain level commensurate with an initial peak signal, would be rather slow, and data from the initial burst would, to some extent, be lost as it would take many sample steps before the gain is effectively reduced.

To establish more suitable initial conditions, there is provided an early gain selector 45. This gain selector 45 is, in effect, a switch which presets the states of all four stages of the counter 40 to any particular desirable value. Thus, the switch 45 provides for an initial gain code operating for establishing the early gain level in the amplifiers. If the device is used by an experienced operator, he will adjust the early gain to such a level as he expects the initial peak signal to reach.

Additionally, for the initial period of expectancy, it is necessary to override the automatic gain control so that the system is maintained in the state of expectancy at the early gain selected by the selector switch 45. Hence, there is provided a trip control device 46 which initially blocks the outputs of detectors 35 and 36 so that they are unable to control incrementing and decrementing of the counter 40.

The input side of the trip level control device 46 may be connected either through a conductor channel 47 to the output of the amplifier 30 which is in the input side of the A–D converter 32, or through a conductor 48 to a particular digit channel 33. Additionally, the control device 46 may be adjustable as to the trip level.

As long as the signal received by the trip level control device 46 is below an adjusted and selected level, the output sides of the detectors 35 and 36 are blocked through channels 49 and 49' respectively. After the input signal has exceeded the trip level, these blocking signals are removed and then the automatic gain control device can proceed to operate. Of course, the trip device should not operate after automatic gain range control has begun, because during a run, the trip control should not interfere with the gain range control.

The trip level control 46 and early gain selection may be common to all analog channels, or they may be individual to each channel.

It will be appreciated that the signals for incrementing or decrementing the counter 40 do not have to be derived from the digitizer output, but one can use the analog input thereof. For decrementing the counter 40, the limit detector will be then a threshold switch responding to an analog signal in excess of a present value, and for incrementing the count, the other limit detector will be a threshold switch responding to dropping of the analog signal below a second preset value. In either case, the signal will ultimately be effective in that the digital output is retained between the limits which are apart by a gain factor equal to the fine gain adjustment step which is 6 decibels. The gain levels are changed if amplified analog signals of a run differ by more than 6 DB in one direction or the other.

Since coarse gain changes are controlled only in an amplifier when disconnected from the digitizer, no switching noise is introduced into the system for coarse gain level changes in the amplifiers 21 and 22. There is sufficient time for the output of these post amplifiers to settle after having been subjected to a gain change. As was stated above, the gain changes in the disconnected postamplifier are not made in symmetrical relationship with regard to a range of four gain levels for which a postamplifier remains disconnected (see FIG. 2). Consider, for example, the amplifier 21. The amplifier is disconnected for gain levels five, six, seven, and eight, and the gain is changed in the amplifier 21, for example, between gain levels seven and eight. We shall now describe the reason for this asymmetry.

A delay in gain level changes is introduced only for gain increases, but not for gain decreases. Thus, different periods of time are required to make, for example, four sequential gain level changes. Consider at first the case of a rather high increase in amplitude, for example, covering a range in excess of 24 DB. This requires a reduction of the gain by four gain levels. It will thus take four sample cycles before the appropriate gain level has been reached. If we assume a sample rate of one thousand per second, the gain will be readjusted once every millisecond. A four-level gain change will thus take 4 milliseconds. This corresponds to a dynamic rate of $6\times10^3$ DB/sec., which is appropriate as faster changes in signal amplitude are rarely expected to occur.

At the changeover from eight to seven, the gain is changed in the disconnected postamplifier 21. Of course, this change does not immediately alter the analog signal because the operating amplifier 22 is connected in the system. Thus, the amplifier 21 has some additional time while the system gain changes from one level to another, and the output of the amplifier 21 has a total of 3 milliseconds to settle. When selected level changes occur, the off-line amplifier is inserted completely into the analog signal path but after the transients resulting from the previous gain changes have decayed.

Now consider the opposite case, say a drop of about 12 DB. It is further assumed that the system operates at gain level six when the drop occurs. As the gain level is changed from six to seven, the disconnected amplifier 21 changes its gain. Another change in gain level cannot occur after one more sampling cycle because the delay device 37 first monitors whether or not the signal drop is due to a zero crossing or is a real one. This "release window" lasts for 30 or even 50 milliseconds. Thus, the amplifier 21 can settle for the period of the delay introduced by the device 37 before permitting any increase in gain. The system follows a signal drop at a release rate of 200 DB/sec. for a 30-millisecond release rate. A run will usually last several seconds, and the system as described covers a total range of 168 DB. Thus, the release rate amply suffices for the usual conditions.

FIG. 3 illustrates an example of a seismic run. FIG. 3*a* shows the envelope of an output signal for the geophone. Time zero is the instant of exploding the exploratory charge. The output of the geophone will thus be at the response level for noise which is over 100 DB down from maximum output of the geophone. These conditions are maintained for a period depending upon the distance of the geophone from the explosion. As shown here, this delay is about one-tenth of a second. This early gain level was adjusted to 18 DB down from the maximum amplitude signal meaningful detectable with the geophone. The trip level was adjusted to 24 DB down from the early gain level.

Thus, the early gain was adjusted so that the signal as expected will be placed directly or at least approximately in the proper gain range, which is approximately gain level three. From there, the device proceeds to adjust the gain automatically. In most cases, gain is increased as the signal decays slowly and over a 3 second period as illustrated. By operation of the gain control, the analog signal is transformed to assume a configuration as shown in FIG. 3*b*.

It should also be noted that if the setting of the early gain is one level, i.e., 6 DB short of the expected amplitude, this can be tolerated because then the gain is controlled in the down direction. The trip sensitivity which is common to all channels is expressed in decibels below the early gain level. The trip sensitivity is as stated set at 24 DB at the input level at which the trip occurs is −40 DB below the maximum of 1 volt of geophone output. The combination of early gain and trip sensitivity should always be great enough to assure that gain control will commence at the early signal.

After the seismic signal level exceeds the trip level, gain control becomes active and attempts to maintain the digitizer level between one-half scale and one-quarter scale corresponding to an upper control level of −6 DB and a lower control level of −12 DB as shown in FIG. 3*c*. As it can be seen, the digital signal to be recorded normally has 12 or more digits throughout most of the run, until the final adjusted gain has been reached.

Examples of −6 DB gain reductions may be seen at approximately 1.3 or 1.5 second in the figure. These are examples of a 6,000 DB per second attack rate. Examples of gain increases requiring a sliding window may be viewed at 0.25 and 0.35 seconds. When the gain reaches the final level of 84 DB, the automatic gain control has extended itself to the limit. The signal declining thereafter continues to fall after passing the quarter scale control point as illustrated, about 2 seconds after the run began.

The digital value of the signal as it appears subsequent to tripping and as plotted in FIG. 3*b* is recorded. The second information needed for recording is the gain code representing gain levels which are plotted as step function in FIG. 3*c*, and the gain code for some values is written in binary expansion next to several of the gain levels.

The invention is not limited to the embodiment described above, but all changes and modifications thereof not constituting departures from the spirit and scope of the invention are intended to be included.

What is claimed is:

1. Circuit apparatus for preparing an input analog signal for recording in digital form, comprising:
 an amplifier system comprising at least a pair of selectively gain controllable individual amplifier stages and having an input for receiving an input analog signal and for forming a first digital output signal suitable for recording from such an input;
 gain adjustment means incorporated in said amplifier system for controllably and selectively altering the gain of said amplifier system by controllably and selectively altering the gain of said amplifier stages;
 means responsive to the amplitude of the input analog signal for changing the gain upwardly and downwardly of said amplifier system by operation of said gain adjustment means by levels wherein adjacent levels differ by a factor readily expressed in exponential form, said means controlling at least partially the gain of said amplifier system; and,
 means responsive to the gain level of said amplifier system at the time said amplifier system forms the first digital signal to form a second digital signal representative of the gain level.

2. The circuit apparatus of claim 1 being further defined wherein said first and second amplifier stages are operatively selectively switched into and out of said amplifier system by said gain adjustment means.

3. The circuit apparatus of claim 2 wherein said first and second amplifier stages are so connected in said amplifier system that one of said amplifier stages is out of said amplifier system when the other is in said system, and changes in the gain of said amplifier stage are achieved by said gain adjustment means only when said amplifier stage is out of said amplifier system.

4. The circuit apparatus of claim 1 further including:
 a pair of parallel amplifier stages;
 switch means connected to the output of said pair of amplifier stages, said switch means connecting one of said amplifier stages connecting and disconnecting the other of said pair in said amplifier system;
 said gain adjustment means controllably altering the gain of the disconnected one of said pair of amplifier stages; and,
 said switch means further returning the disconnected one of said pair of amplifier means to said amplifier system.

5. The invention of claim 1 including:
 a second amplifier stage in cascade with a first amplifier stage, said first amplifier stage having gain levels which differ by at least twice the gain levels of said second amplifier stage;
 and wherein said gain levels differ by an exponential base of two;
 counter means for storing at least two bits of data in a predetermined sequence;
 said gain adjustment means incorporating a switch means connected with said first and second amplifier stages in a manner such that the gain level of said first and second amplifier stages is controllably altered by operation of said switch means; and,
 decode matrix means connected to said switch means and providing an input to said counter means representative of the altered gain levels in binary form for storage therein.

6. The circuit apparatus of claim 1 further including:
 lower limit detector means connected to said amplifier system output for forming an indication when the output falls below a predetermined level;
 upper limit detector means connected to said amplifier system output for forming an indication when the output rises above a predetermined level;
 counter means capable of counting up and down and having as inputs for controlling the count therein the indications of said lower and upper limit detector means;
 decode matrix means connected to said counter means for forming control signals applied to said gain adjustment means to controllably alter the gain level of said amplifier system; and,
 said responsive means periodically obtaining the count in said counter means for the second digital signal.

7. The invention of claim 1 wherein said first amplifier stage is in parallel with said second amplifier stage, said first and second amplifier stages each having selectable, interleaved gain levels which levels differ by factors of two; said gain adjustable means exclusively connecting only one of said first and second amplifier stages into said amplifier system; and further including means for changing the gain of said first and second amplifier stages, said means functioning only on said amplifier stage which is not connected in said amplifier system by said gain adjustable amplification means.

8. The circuit apparatus of claim 1 including:
 a digitizer in said amplifier system connected to provide the first digital signal output;
 a second amplifier stage connected in parallel with a first amplifier stage;
 a third amplifier stage;
 connective means for connecting in cascade one of said first or second amplifier stages with said third amplifier stage;
 said first, second and third amplifier stages each individually having gain levels which differ by factors of two to some whole number power;
 said third amplifier stage having at least two gain levels differing by a factor of two between adjacent gain levels while said first and second amplifier stages have gain levels differing by at least $2^2$ such that said third amplifier stage provides fine changes in gain of said amplifier system while said first and second amplifier stages provide coarse changes in gain level;

switch means in said gain adjustment means for controllably providing fine and coarse changes in said amplifier system;

counter means for storing a count of at least two bits;

decode matrix means connected to said counter means and responding to the count therein for forming control signals operatively setting said switch means to adjust the gain level of said amplifier system; and, means for changing the count in said counter means upwardly and downwardly, said means being at least partially responsive to the input analog signal.

9. The circuit apparatus of claim 8 further including:

lower limit detector means connected to the output of said digitizer for detecting a digitized value therefrom falling below a predetermined level;

upper limit detector means connected to the output of said digitizer for detecting a digitized value therefrom rising above a predetermined level;

said upper and lower limit detector means forming pulses decrementing and incrementing respectively the count stored in said counter means; and, wherein the predetermined levels causing detection by said lower and upper limit detector means differ by a factor of two.

10. The invention of claim 9 further including means supplied with the input analog signal and responsive to the advent of the signal, said means being operatively interconnected between said counter means and said upper and lower limit detector means to initiate decrementing or incrementing of the counter of said counter means only after advent of the input analog signal.

11. The invention of claim 10 further including means for setting into said counter means a predetermined first count so that said counter means begins its operation by decrementing or incrementing from the first count after operation of said means responsive to the advent of the signal.

12. The invention of claim 8 wherein said switch means provides coarse gain level changes by altering the gain of said first or second amplifier stages only in one of said amplifier stages when disconnected in the cascade of said amplifier system as arranged by said connective means.

13. The invention of claim 9 wherein said digitizer has a maximum input level and wherein said upper limit detector means has a predetermined level at about one half the maximum input level of said digitizer, and said lower limit detector means has a predetermined level at one-half of that of said upper limit detector means, and wherein said third amplifier stage is controllably switched in gain level by said gain adjustable amplification means to maintain the input to said digitizer within the predetermined limits of said upper and lower limit detector means.

14. A method of converting an input analog signal into a digital signal comprising the steps of:

passing the input analog signal through a cascade of amplifier stages which are at least partially adjustable in gain levels;

thereafter passing the analog signal through a digitizer to form a first digital signal at least partially representative of the input analog signal;

selectively adjusting the gain of the cascade of amplifier stages upwardly or downwardly to gain levels which differ by discrete amounts expressed in exponential form to maintain the signal output of the digitizer within a predetermined range; and, expressing the gain of the cascade of amplifier stages in exponential form as a second digital signal which with the first digital signal describes the input analog signal.

15. The method of claim 14 further including the step of forming a sign bit to describe the polarity of the input analog signal.

16. The invention of claim 14 wherein the cascade of amplifier stages includes at least a stage adjustable to gain levels which differ by a factor expressed by the ratio $X^n$ where X is the base and $n$ is the power and is a whole number greater than two, and a second stage is adjustable to gain levels which differ by a ratio X, and including the step of adjusting the gain of the cascade of amplifier stages by achieving coarse gain level changes in the one amplifier stage and fine gain level changes in the other amplifier stage.

17. The invention of claim 14 wherein the cascade of amplifier stages includes a pair of parallel amplifier stages, each with gain levels which differ by levels given by the ratio $2^n$ where $n$ is a whole number greater than two, and each has at least two gain levels and the gain levels are interleaved, said method further including the steps of disconnecting one of the parallel stages while connecting the other in the cascade of amplifier stages, and altering upwardly or downwardly the gain of the disconnected one of the pair of amplifier stages.

18. The method of claim 17 further including the method step of forming a binary number representative of the gain change effected in the disconnected amplifier stage compared with the gain of the connected amplifier stage prior to reversing the connection of the amplifier stages, and thereafter encoding the binary number as a portion of the second digital number.

19. The method of claim 17 wherein the cascade of amplifier stages includes a third amplifier stage adjustable in gain level in which adjacent gain levels differ by a ratio of two and the number of gain levels thereof is equal to or less than $n$, said method further including the method steps of changing gain of the cascade of amplifier stages upwardly or downwardly as needed between gain levels differing by a ratio of two wherein the change in gain, where possible, is accomplished in the third stage, and where not possible is accomplished in the disconnecting of one of the parallel stages and connecting the other of the parallel stages in the cascade of amplifier stages while substantially simultaneously changing the gain level of the third amplifier stage between its highest and lowest gain levels such that the change in gain level of the cascade of amplifier stages is no greater than two.

* * * * *